(12) United States Patent
Chalaud (10) Patent No.: US 10,823,074 B2
(45) Date of Patent: Nov. 3, 2020

(54) RECIRCULATION OF FLUID THROUGH A TURBOMACHINE CENTRIFUGAL PUMP

(71) Applicant: SAFRAN AIRCRAFT ENGINES, Paris (FR)

(72) Inventor: Sebastien Christophe Chalaud, Vincennes (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 271 days.

(21) Appl. No.: 15/769,556

(22) PCT Filed: Oct. 21, 2016

(86) PCT No.: PCT/FR2016/052732
§ 371 (c)(1),
(2) Date: Apr. 19, 2018

(87) PCT Pub. No.: WO2017/068299
PCT Pub. Date: Apr. 27, 2017

(65) Prior Publication Data
US 2018/0313271 A1    Nov. 1, 2018

(30) Foreign Application Priority Data

Oct. 23, 2015    (FR) ...................................... 15 60137

(51) Int. Cl.
*F02C 7/236*        (2006.01)
*F02C 7/224*        (2006.01)
(Continued)

(52) U.S. Cl.
CPC ................. *F02C 7/224* (2013.01); *F02C 7/06* (2013.01); *F02C 7/232* (2013.01); *F02C 7/236* (2013.01);
(Continued)

(58) Field of Classification Search
CPC .. F02M 21/10; F02M 31/163; F02M 2200/25; F02M 37/04–37/048;
(Continued)

(56) References Cited

U.S. PATENT DOCUMENTS 4,187,813 A  *  2/1980  Stumpp .............. F02M 37/0035
                                                  123/510
5,116,362 A       5/1992  Arline et al.
(Continued)

FOREIGN PATENT DOCUMENTS

WO    WO 2013166122 A2 *  11/2013  .............. F04B 23/14

OTHER PUBLICATIONS

International Search Report dated Feb. 20, 2017 in PCT/FR2016/052732 filed Oct. 21, 2016.
(Continued)

*Primary Examiner* — Peter J Bertheaud
*Assistant Examiner* — Dnyanesh G Kasture
(74) *Attorney, Agent, or Firm* — Oblon, McClelland, Maier & Neustadt, L.L.P.

(57) ABSTRACT

A supply system for supplying a turbomachine with fluid. The supply system includes at least one centrifugal pump and a fluid recirculation branch. The fluid recirculation branch includes an inlet situated downstream of the centrifugal pump and an outlet situated upstream of the centrifugal pump or fluidically connected with a node situated upstream of the centrifugal pump, in such a way that at least one portion of the fluid circulates in the centrifugal pump. The fluid recirculation branch includes a valve situated between the inlet and the outlet, the valve including a shutter configured to open/close as a function of the temperature of the fluid.

7 Claims, 4 Drawing Sheets

(51) Int. Cl.
*F02C 7/06* (2006.01)
*F02C 7/232* (2006.01)
*F04D 13/14* (2006.01)
*F04D 27/00* (2006.01)

(52) U.S. Cl.
CPC .......... *F04D 13/14* (2013.01); *F04D 27/009* (2013.01); *F05D 2220/323* (2013.01); *F05D 2260/606* (2013.01); *F05D 2260/98* (2013.01); *F05D 2270/303* (2013.01)

(58) Field of Classification Search
CPC ...... F02M 37/14; F02M 37/18; F02M 39/005; F02C 7/224; F02C 7/236; F02C 7/232; F02C 7/06; F04D 27/009; F04D 13/14; F05D 2220/323; F05D 2260/606; F05D 2260/98; F05D 2260/303; F05D 2270/303
See application file for complete search history.

(56) References Cited

U.S. PATENT DOCUMENTS

| | | | |
|---|---|---|---|
| 10,125,732 B1* | 11/2018 | Nyzen | F04C 14/26 |
| 2003/0136103 A1 | 7/2003 | Reuter et al. | |
| 2011/0296846 A1* | 12/2011 | Aurousseau | F02C 7/275 |
| | | | 60/787 |
| 2012/0204532 A1* | 8/2012 | Potel | F02C 7/236 |
| | | | 60/39.48 |
| 2014/0219826 A1 | 8/2014 | Clements | |
| 2017/0107987 A1* | 4/2017 | Nyzen | F04C 2/084 |

OTHER PUBLICATIONS

French Preliminary Search Report dated Sep. 15, 2016 in French Application 15 60137 filed Oct. 23, 2015.

* cited by examiner

RECIRCULATION OF FLUID THROUGH A TURBOMACHINE CENTRIFUGAL PUMP

TECHNICAL FIELD

The invention relates to the general technical field of supply systems for supplying fluid such as fuel or lubricant. More precisely, the invention is concerned with fluid recirculation to re-heat it.

STATE OF PRIOR ART

A supply system for supplying a turbomachine with fuel, of a known design, comprises a low pressure pump and a high pressure displacement (volumetric) pump downstream of the low pressure pump. This high pressure displacement pump is configured to deliver a constant fuel flow rate towards a combustion chamber of the turbomachine.

The supply system includes a fuel recirculation loop enabling the outlet of the displacement pump to be fluidly connected to the inlet of the displacement pump, to circulate a fuel excess to the inlet of the displacement pump.

The fuel is warmed up when it is recirculated. However, the fuel flow rate in the recirculation loop is substantially independent of the fuel temperature. But, the fuel circulating in the supply system requires sometimes to be warmed up, in particular when the turbomachine is at a high altitude or in extreme cold.

Thus, there is a need to warm up fuel, while limiting power losses in the supply system.

DISCLOSURE OF THE INVENTION

The invention aims at overcoming at least partially the problems met in the solutions of prior art.

In this regard, one object of the invention is a supply system for supplying a turbomachine with fluid. The supply system comprises at least three centrifugal pumps in series, and a displacement pump located downstream of at least one of the centrifugal pumps and configured to supply an injection system with fluid. The supply system comprises a low pressure pump unit comprising at least two of the centrifugal pumps in series, the low pressure pump unit being located upstream of the displacement pump so as to supply the displacement pump with fluid.

The centrifugal pumps, unlike the displacement pumps, are kinetic pumps, that is the outlet pressure is generated by the kinetic energy of the fluid moved by the pump. The category of kinetic pumps essentially comprises the centrifugal pumps. In what follows, the term "centrifugal pump" is used to designate not only the centrifugal pumps in the strict common sense but also any kinetic pump.

The supply system is subdivided at an inlet node, located downstream of the low pressure pump unit, into an injection system supply circuit and a variable geometry supply circuit, the injection system supply circuit comprising the displacement pump and being configured to supply the injection system with fluid.

According to the invention, the variable geometry supply circuit comprises a complementary pump unit comprising a centrifugal pump called a first centrifugal pump and variable geometries downstream of the first centrifugal pump, and the supply system comprises a fluid recirculation branch which includes:

an inlet located between the first centrifugal pump and the variable geometries, an outlet located upstream of the first centrifugal pump, or downstream of the variable geometries and in fluid communication with an outlet node located upstream of the first centrifugal pump, such that at least one part of the fluid passing through the recirculation branch recirculates in the first centrifugal pump, and a vane located between the inlet and the outlet of the fluid recirculation branch, the vane comprising a obturator configured to open/close as a function of the fluid temperature.

The vane enables fluid to be further recirculated when its temperature is abnormally low, to re-heat it. Further, the vane closes to limit fluid recirculation when the fluid temperature is high enough, which enables power losses to be reduced in the supply system.

The vane offers the possibility to heat the fuel in order to reach a predetermined temperature, in order to improve the combustion efficiency by injecting hot fuel. This flexibility is not allowed by oil-fuel exchangers and/or air-oil exchangers.

The fluid in the supply system is in particular oil or fuel.

The invention can optionally include one or more of the following characteristics combined with each other or not.

Preferably, the low pressure pump unit and/or the variable geometry supply circuit do not comprise any displacement pump.

Preferably, the upstream circuit is also free from displacement pump.

Preferably, the low pressure pump unit consists of a plurality of centrifugal pumps in series. The low pressure pump unit preferably comprises between two and five centrifugal pumps.

According to one feature of embodiment, the outlet node is located between two pumps of the low pressure pump unit or upstream of the low pressure pump unit.

Alternatively and according to another feature of embodiment, the outlet node is located between the low pressure pump unit and the first centrifugal pump or both downstream of the low pressure pump unit and upstream of the displacement pump.

Advantageously, the vane comprises at least one element chosen from a check valve, a valve, a packing and a slide valve.

According to one advantageous embodiment, opening and/or closing the obturator of the vane is controlled by an electronic regulation system of a turbomachine, or the vane is configured such that the obturator is automatically closed if the temperature of the fluid passing through the vane exceeds a threshold value.

According to one feature of embodiment, the obturator comprises only two stable positions, an opening end position in which the vane lets fluid circulate in the recirculation branch and a closing end position in which the vane prevents fluid from circulating in the recirculation branch.

Preferably, the high pressure pump is a displacement gear pump configured to be mechanically driven by a turbomachine transmission gearbox.

Alternatively, the high pressure displacement pump is preferably an electrical pump controlled by an electronic regulation system of the turbomachine.

The invention is also concerned with a turbomachine for an aircraft comprising a fluid supply system as defined above.

The invention also deals with a turbomachine comprising a differential gear reducer configured to rotatably drive at least one propeller and for being supplied with lubricant by the supply system as defined above. In this case, the turbomachine is for example a turbomachine with a set of non-ducted counter-rotating propellers, also known as "Open Rotor".

BRIEF DESCRIPTION OF THE DRAWINGS

The present invention will be better understood upon reading the description of exemplary embodiments, given by way of purely indicating and in no way limiting purposes, making reference to the appended drawings in which.

DETAILED DISCLOSURE OF PARTICULAR EMBODIMENTS

Identical, similar or equivalent parts of the different figures bear the same reference numerals so as to facilitate switching from one figure to the other.

Figure 1:
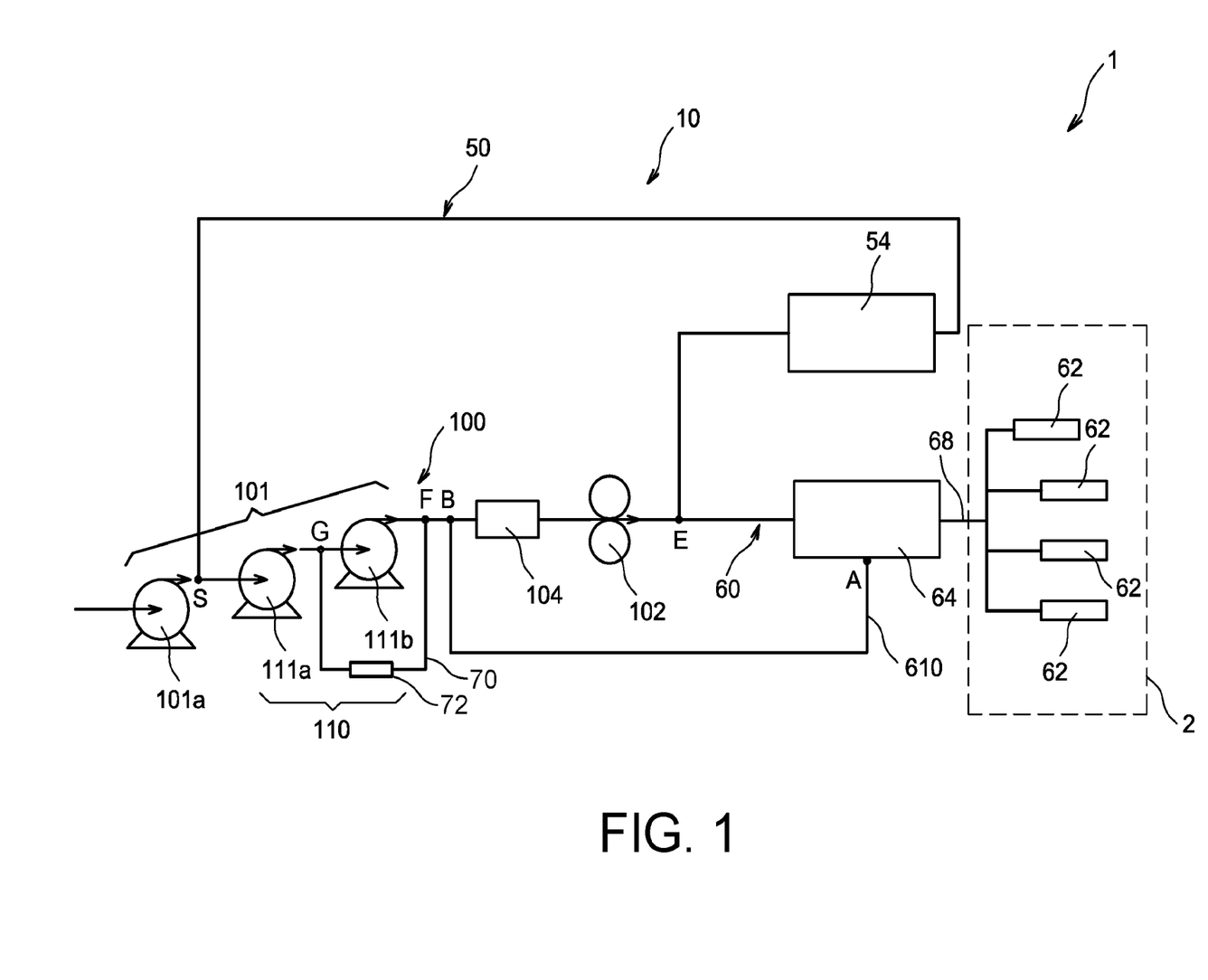
FIG. 1 is a partial schematic view of a supply system for supplying an aircraft turbomachine with fuel, according to a first embodiment.

FIG. 1 represents a supply system 10 of a turbomachine 1 for supplying an aircraft with fluid. In the embodiment described, the fluid is fuel. The turbomachine is an aircraft turbomachine 1 such as a turbofan engine or a turboprop engine.

However, when the turbomachine 1 comprises a differential gear reducer (not represented) configured to rotatably drive at least one propeller, the fluid can also be lubricant, typically oil.

The supply system 10 comprises an upstream circuit 100 and a downstream circuit 50, 60. The downstream circuit 50, 60 is connected to the upstream circuit 100 downstream of the upstream circuit 100, at a node E. The terms "upstream" and "downstream" are defined in reference to the general fuel flow direction in the supply system 10 towards the combustion chamber 2.

The upstream circuit 100 comprises a low pressure pump unit 101, a high pressure displacement pump 102, and a hydraulic resistance 104 disposed between the low pressure pump unit 101 and the displacement pump 102.

The term "hydraulic resistance" is used to define in this document, by analogy with the field of electricity, the quantity from the ratio of the fluid pressure difference between the inlet and the outlet of an element of the supply system to the flow rate of the fluid passing through the element. By metonymy and still by analogy with the field of electricity, the term "hydraulic resistance" is also used to designate an element of the supply system characterised by this quantity. The hydraulic resistance 104 of the upstream circuit 100 comprises for example an exchanger, a fuel filter, a block valve and/or a flow meter.

The downstream circuit 50, 60 comprises a variable geometry supply circuit 50, and an injection system supply circuit 60 for supplying injection systems 62 of the combustion chamber 2.

The low pressure pump unit 101 comprises a plurality of centrifugal pumps 101a, 111a, 111b in series. In the embodiment represented in FIG. 1, the low pressure pump unit 101 consists of three centrifugal pumps 101a, 111a, 111b in series and side by side, so as to form a pump block.

The low pressure pump unit 101 increases the pressure of the fuel flowing towards the downstream circuit 50, 60. It is in particular configured to sufficiently fill the high pressure displacement pump 102, that is to prevent cavitation risks inside this pump 102.

The low pressure pump unit 101 with several centrifugal pumps increases the fluid pressure towards the high pressure pump 102 more than a single centrifugal pump.

The high pressure pump 102 is a displacement gear pump configured to be mechanically driven by a transmission gearbox of a turbomachine 1. It delivers a fuel flow rate determined as a function of the engine rotation speed, this flow rate being thus constant at a given engine speed.

The upstream circuit 100 also includes a recirculation branch 70. The inlet F of the recirculation branch 70 is located between the low pressure pump unit 101 and the displacement pump 102. The outlet G of the recirculation branch is located between two pumps 111a and 111b of the low pressure pump unit 101.

The recirculation branch 70 comprises a vane 72 between its inlet F and its outlet G. In the present document, the term "vane" has in particular a broad sense to cover any device likely to modify/vary the fluid flow rate in the recirculation branch.

The vane 72 comprises a obturator configured to open/close as a function of the fuel temperature. It comprises at least one element chosen from a check valve, a valve, a packing and a slide valve. The fuel temperature is taken in the vane 72 or in the recirculation branch 70 in the proximity of the vane 72.

By temperature taking, it is meant a measurement of the temperature by any adapted means, or even the placement of a device which takes heat from fuel to modify the obturator position.

In the first embodiment, the vane 72 is a passive vane which takes heat from fuel. It comprises for example a wax the melting temperature of which is close to a threshold value $S_0$, such that the state change of the wax modifies the obturator position.

The obturator of the vane 72 automatically opens when the fuel temperature becomes lower than the threshold value $S_0$, that is when the wax is solidified in the example of passive vane above. It automatically closes when the fuel temperature becomes higher than the threshold value $S_0$, that is for example when the wax liquefies. The obturator opens/closes automatically afterward, that is without a control system.

Opening the obturator enables re-heated fuel to be recirculated through the centrifugal pump 111b, since the fuel that has been re-heated in the ducts of the recirculation branch 70 is re-injected into the centrifugal pump 111b.

The variable geometry supply circuit 50 and the supply circuit 60 for supplying the injection systems 62 are separated at the inlet node E which acts as the junction between the upstream circuit 100 and the downstream circuit 50, 60.

In the injection system supply system 60, the combustion chamber 2 is supplied with fuel by fuel injectors which cooperate with injection systems 62.

The supply circuit 60 supplying the injection systems also comprises a discharge valve and a fuel metering valve, represented by the block 64 and for regulating the flow rate towards the combustion chamber 2.

The discharge valve and the fuel metering valve 64 are designed to redirect a fuel excess in the supply circuit 60 to the upstream circuit 100, through a fuel recirculation loop 610.

The fuel flow rate at the outlet of the high pressure displacement pump 102 is, in a known manner, higher than the flow rate necessary to feed the injection systems 62, irrespective of the flight phase concerned of the turbomachine 1. The recirculation loop 610 is for circulating the fuel excess from a first node A, located downstream of the inlet node E, and an exhaust node B.

The exhaust node B is located between the low pressure pump unit 101 and the high pressure displacement pump 102. In the first embodiment, it is located between the low pressure pump unit 101 and the hydraulic resistance 104, and it is located downstream of the inlet F of the recirculation branch 70.

This fuel recirculation re-heats it. However, the flow rate recirculated in the recirculation loop 610 depends in particular on fuel needs of the injectors 62 and not on the desired temperature for the fuel, unlike the fuel flow rate in the recirculation branch 70 which in turn is specifically regulated so as to be able to control fuel re-heating.

The variable geometry supply circuit 50 is configured to convey fluid through variable geometries 54.

The variable geometries 54 are pieces of equipment of the turbomachine 1 which require to take hydraulic power to operate. The variable geometries 54 can be of various natures, for example a cylinder, a servovalve, an adjustable discharge valve of the compressor, a transitory discharge valve of the compressor, and/or an air flow rate adjusting valve for a clearance adjustment system at the apex of rotor vanes for a low pressure turbine or high pressure turbine.

The variable geometry supply circuit 50 extends between the inlet node E and the outlet node S which connects the variable geometry supply circuit 50 to the upstream circuit 100.

In the embodiments in reference to FIGS. 1 to 4, the outlet node S of the supply system 10 is located between two pumps 101a, 111a of the low pressure pump unit 101. More precisely, the outlet node S is located between an upstream pump block 101a comprising a centrifugal pump and a downstream pump block 110 comprising two centrifugal pumps 111a, 111b.

The position of the outlet node S is determined as a function of the desired pressure at the outlet of the variable geometries 54, so as to obtain a sufficient pressure differential across the variable geometries to ensure control thereof, however without risk of vaporising fuel because of a too low fuel pressure at the outlet node S.

Figure 2:
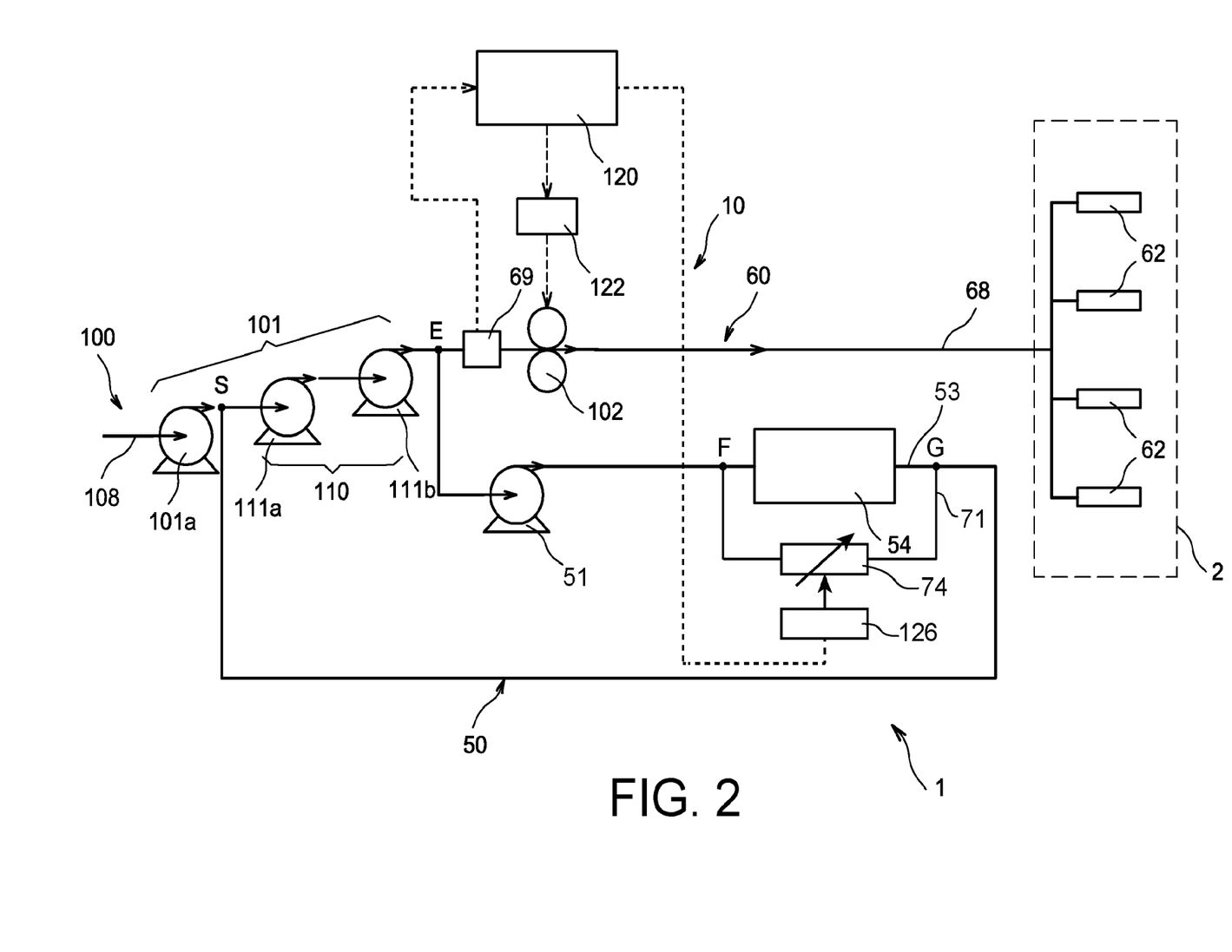
FIG. 2 is a partial schematic representation of a fluid supply system of a turbomachine, according to a second embodiment of the invention.
Figure 3:
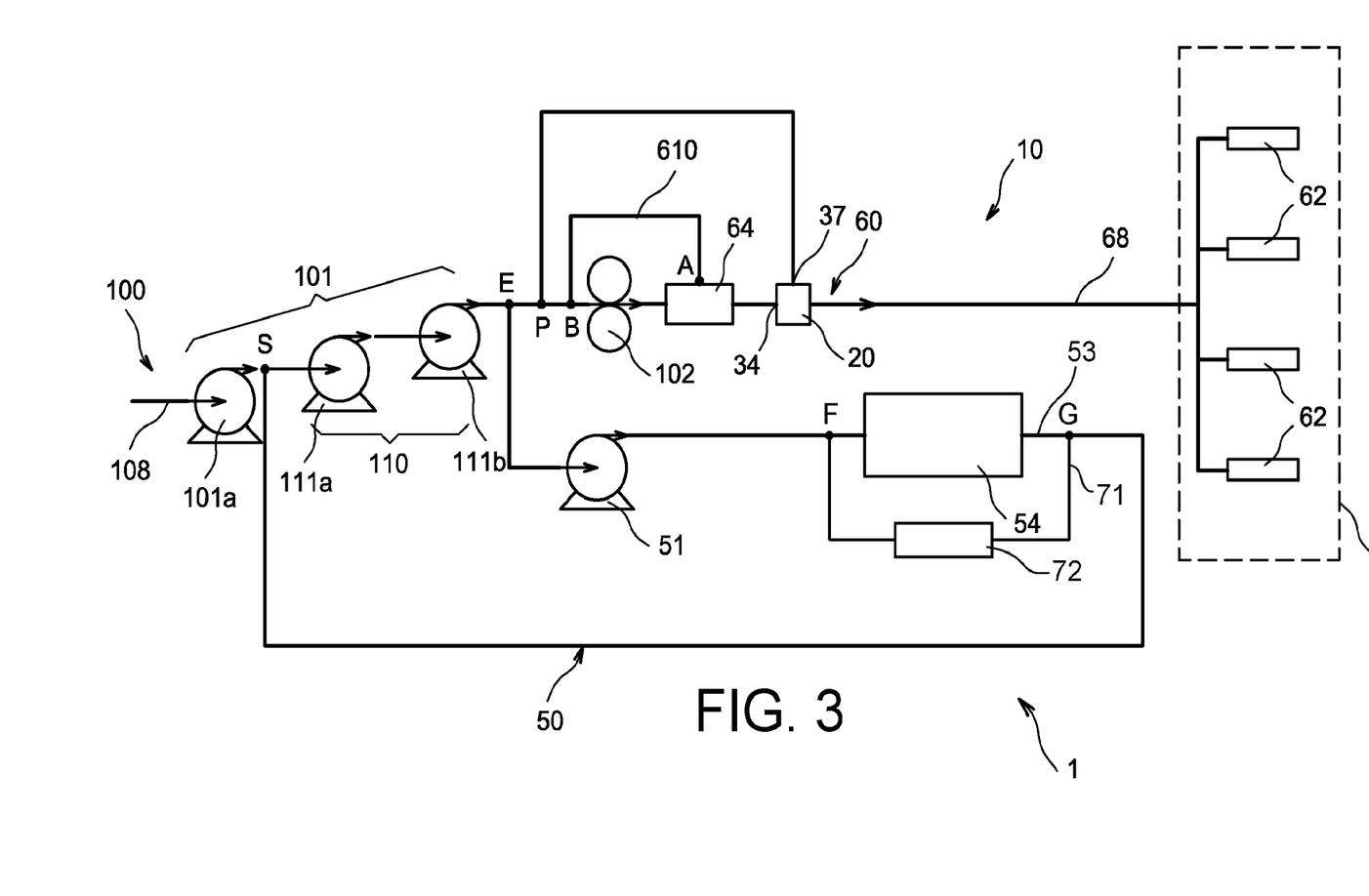
FIG. 3 is a partial schematic representation of a fluid supply system of a turbomachine, according to a third embodiment of the invention.
Figure 4:
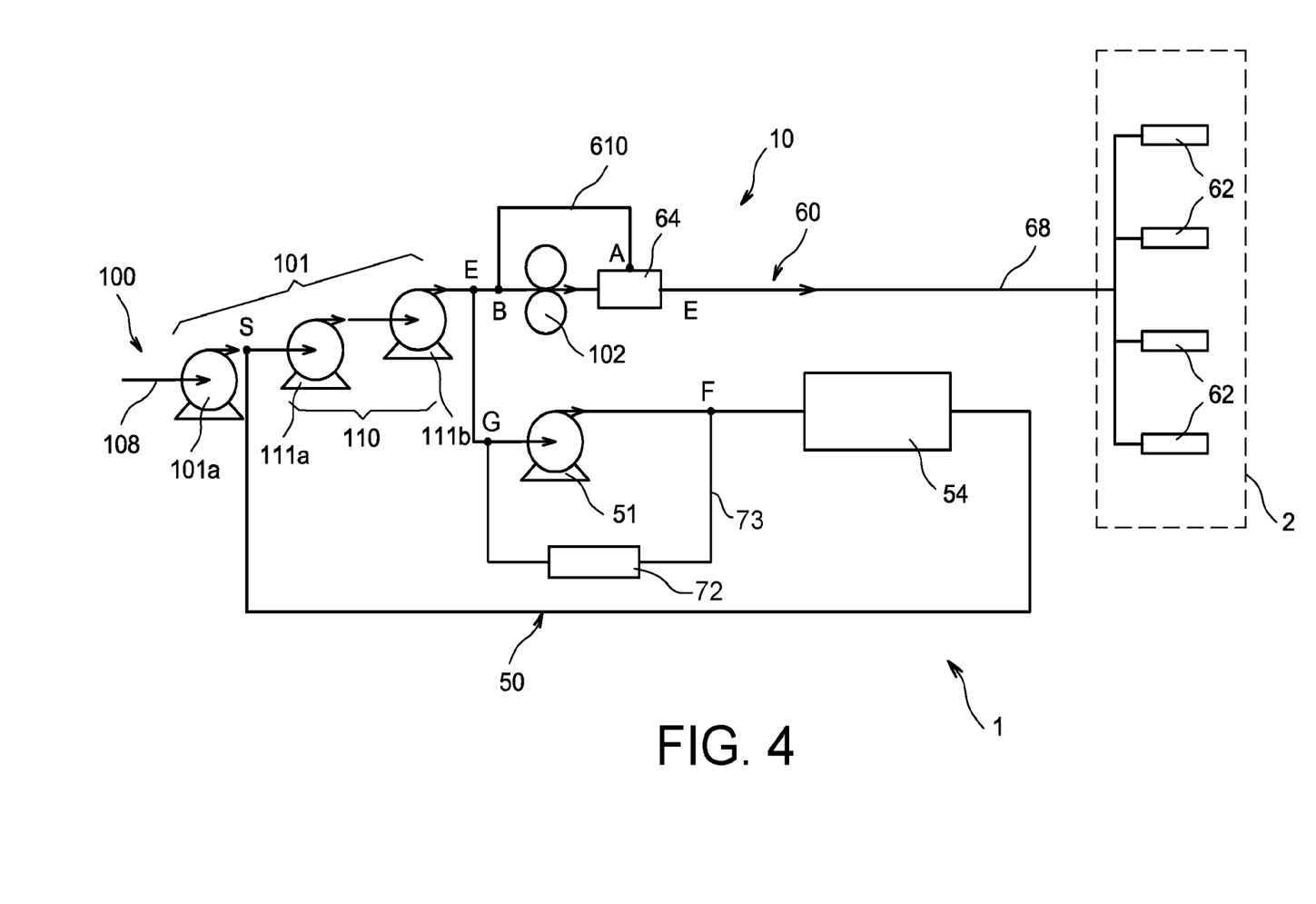
FIG. 4 is a partial schematic representation of a fluid supply system of a turbomachine, according to a fourth embodiment of the invention.

The supply systems 10 represented in FIGS. 2 to 4 are mainly distinguished from that of FIG. 1 in that the upstream circuit 100 is free from high pressure displacement pump and in that the downstream circuit 50, 60 comprises the high pressure displacement pump 102.

The node E for separating the variable geometry supply circuit 50 and the injection system supply circuit 60 is in particular located between the low pressure pump unit 101 and the displacement pump 102.

The high pressure displacement pump 102 is part of the injection system supply circuit 60, which enables the flow rate of fuel provided by the displacement pump 102 to be decreased. Heat losses of the supply system 10 are accordingly reduced.

The variable geometry supply circuit 50 is free from displacement pump 102. It comprises a complementary pump unit 51 comprising at least one centrifugal pump.

The complementary pump unit 51 enables a sufficient pressure level to be reached in the variable geometry supply circuit 50, in order to always exceed the minimum pressure differential required across the variable geometries to ensure control thereof in any circumstance. It makes it possible to fulfil a significant specific flow rate need of the variable geometries 54, for example during a movement of a hydraulic actuator cylinder.

The low pressure pump unit 101 and the complementary pump unit 51 form a kinetic pump assembly of the supply system 10, in that all the pumps of this assembly operate by kinetic pumping.

In the second and the third embodiment, corresponding respectively to FIGS. 2 and 3, the supply system 10 comprises a recirculation branch 71 having its inlet F located between at least one centrifugal pump, called a first centrifugal pump in the present application, of the complementary pump unit 51 and the variable geometries 54. The outlet G of the recirculation branch 71 is located downstream of the variable geometries 54, on a duct of the variable geometry supply circuit 50 which terminates at the outlet node S, which outlet node connects the duct to the upstream circuit 100.

The vane 72 is thereby located in the recirculation branch 71 between the inlet F and the outlet G, bypassing the variable geometries 54. The variable geometries 54 are located in a main branch 53 of the variable geometry supply circuit 50 between the node E and the outlet node S.

The vane 72 also comprises at least one element chosen from a check valve, a valve, a packing and a slide valve. The position of the obturator of the vane 72 can in particular be configured to vary from a plurality of intermediate stable positions between an opening end position and a closing end position of the obturator.

In specific reference to FIG. 2, opening/closing the obturator is controlled by an electronic regulation system 120 via an electronic regulation module 126, as a function of the fuel temperature.

The measurement of the fuel temperature taken into account by the electronic regulation system 120 is for example performed at a temperature sensor 69 located at the inlet node E.

It is also possible not to have a dedicated temperature sensor 69, and to use an existing temperature sensor dedicated to the measurement of ambient temperature by making use of its data using a model. This model associates the ambient temperature with an estimated fuel temperature. It is still also possible to use an oil temperature sensor, because the oil temperature is directly related to that of the fuel because of the oil/fuel exchange.

Moreover, the displacement pump 102 is herein actuated by an electric motor, instead of being driven by a cinematic chain to a drive shaft of the turbomachine, which enables the fuel delivered by the pump to be accurately metered by controlling the speed of the electric motor driving the pump. This enables a metering valve downstream of the pump to be dispensed with, such as the metering valve 64 previously described in the first embodiment. The electric motor for actuating the displacement pump 102 is controlled by the full authority electronic regulation system 120 of the turbomachine, also known as "FADEC" or "Full Authority Digital Engine Control" via an electronic regulation module 122.

Conventionally, this electronic regulation system 120 comprises an engine computer with two redundant full authority symmetric ways. The engine computer is for taking many parameters into account to control the flow rate delivered by the high pressure displacement pump 102, as for example: a control from the aircraft pilot, the rotation speed of the high pressure turbomachine body 1 and a flow rate measurement towards the injection systems 62.

The electronic regulation modules 122, 126 are also known as ECU (Electronic Control Unit). They can be possibly the same.

The fuel recirculation loop 610 described previously in the first embodiment has no utility any longer since the metering valve downstream of the pump has been removed. With respect to the first embodiment, a mass gain of the supply system 10, as well as an elimination of the heat losses generated by fuel recirculation in the recirculation loop 610 result therefrom.

The low power provided by the high pressure displacement pump 102 within the injection system supply circuit 60 enables the electric displacement pump 102 to be controlled without resorting to the massive power electronics.

The embodiment of FIG. 3 is distinguished from that of FIG. 2 in that the vane 72 of the recirculation branch 71 is a passive vane, as that of the first embodiment.

The obturator of the vane 72 automatically opens when the fuel temperature in the recirculation branch 71 is lower than the threshold value $S_0$. It automatically closes when the fuel temperature in the recirculation branch 71 is higher than the threshold value $S_0$.

Moreover, the displacement pump 102 is a mechanically driven displacement pump, that is a drive shaft of the turbomachine, as in the first embodiment. Consequently, the supply system also comprises a recirculation loop 610 between a first node A which is located downstream of the displacement pump 102 and an exhaust node B which is located upstream of the displacement pump 102.

Finally, the supply system of the third embodiment includes a head loss regulator 20.

The head loss regulator 20 is located downstream of the high pressure pump 102. It enables the pressure downstream of the high pressure pump 102 to be higher than the pressure upstream of the high pressure pump 102. The low pressure pump assembly 101 thus enables the fluid pressure passing therethrough to be further increased, which enables the work of the high pressure pump 102 to be further reduced. As a result, there is an enhanced decrease of the heat losses in the supply system 10.

The head loss regulator 20 maintains a strictly positive pressure difference between the outlet and the inlet of the high pressure displacement pump 102.

It regulates the head loss in the injection system supply circuit 60 as a function of the pressure difference between its low pressure inlet 37 and its high pressure inlet 34. The low pressure inlet 37 is located upstream of the displacement pump 102. It is connected to a node P which is located herein upstream of the exhaust node B, an arrangement of the node P downstream of the exhaust node B being also possible. The high pressure inlet 34 is located downstream of the metering valve 64.

The fourth embodiment is distinguished from the third embodiment by the position of the outlet G of the recirculation branch 73. This outlet G is located between the low pressure pump unit 101 and the complementary pump unit 51.

The vane 72 of the recirculation branch 73 is a passive vane which is identical to that of the first and the third embodiment.

The recirculation branch 73 is for recirculating fuel through the complementary pump unit 51 only.

The supply system 10 of the fourth embodiment does not include any head loss regulator 20, unlike that of the third embodiment.

Of course, various modifications can be provided by those skilled in the art to the invention just described without departing from the disclosure of the invention.

In particular, in the embodiments of FIGS. 2 to 4, the inlet F of the recirculation branch can be located between the low pressure pump unit 101 and the displacement pump 102. Besides, this inlet F could be located between two pumps of the low pressure pump unit 101.

In the embodiments represented in FIGS. 2 and 3, the outlet G of the recirculation branch 71 is located on a duct of the variable geometry supply circuit 50 which ends to the outlet node S of this variable geometry supply circuit. However, this outlet G could also be located between two pumps of the low pressure pump unit 101, or even upstream of this unit 101.

The obturator of the vane 74 of the second embodiment can indeed include only two stable positions, an opening end position and a closing end position.

Besides, the vane 74 of the second embodiment can be controlled by the electronic regulation system 120 via the same electronic regulation module as that for controlling the electric displacement pump 102.

Generally, the low pressure pump unit 101 comprises a plurality of centrifugal pumps in series. The number of centrifugal pumps of the low pressure pump unit 101 can vary as a function of needs for hydraulic power and fluid flow rate of the turbomachine 1. Likewise, the pumps of the low pressure pump unit 101 are not necessarily identical.

The low pressure pump unit 101 can also include a hydraulic resistance 104 between its centrifugal pumps.

The complementary pump unit 51 can include several centrifugal pumps in series. In this case, the inlet F of the recirculation branch is located between at least one of the pumps of the complementary pump unit 51 called a first centrifugal pump and one of the variable geometries 54.

The centrifugal pumps of the complementary pump unit 51 are not necessarily identical.

Further alternatively, the complementary pump unit 51 can supply only some of the variable geometries 54 of the turbomachine with fluid.

In the first embodiment, the node B is located between the low pressure pump unit 101 and the hydraulic resistance. It could be located between the hydraulic resistance 104 and the displacement pump 102. In any case, it is located upstream of the displacement pump 102.

It is quite contemplatable that the injection system supply circuit 60 of the fourth embodiment is identical to that of the third embodiment. Thereby, it would comprise a head loss regulator 20.

The invention claimed is:

1. A supply system for supplying a turbomachine with fluid, the supply system comprising:
   three centrifugal pumps in series;
   a displacement pump located downstream of the three centrifugal pumps in series and configured to supply an injection system with fluid; and
   a low pressure pump unit comprising said three centrifugal pumps in series, wherein the low pressure pump unit is located upstream of the displacement pump so as to supply the displacement pump with fluid,
   wherein the supply system is subdivided at an inlet node, located downstream of the low pressure pump unit, into an injection system supply circuit and a variable geometry supply circuit, wherein the injection system supply circuit comprises the displacement pump and wherein the injection system supply circuit is configured to supply the injection system with fluid, wherein the variable geometry supply circuit comprises a complementary pump unit comprising at least one centrifugal pump called a first centrifugal pump, wherein the variable geometry supply circuit comprises variable geometries located downstream of the first centrifugal pump, and wherein the variable geometry supply circuit comprises a fluid recirculation branch which includes:
- an inlet located between the first centrifugal pump and the variable geometries,
- an outlet located upstream of the first centrifugal pump, and
- a vane which is located between the inlet and the outlet of the fluid recirculation branch, wherein the vane comprises an obturator configured to open and close depending of the fluid temperature, and wherein the variable geometry supply circuit further includes an outlet node downstream of and in fluid communication with the variable geometries of the variable geometry supply circuit, the outlet node being located fluidly between two centrifugal pumps of the low pressure pump unit.

2. The supply system according to claim 1, wherein the low pressure pump unit and the variable geometry supply circuit do not comprise any displacement pump.

3. The supply system according to claim 1, wherein the vane comprises at least one element chosen from a check valve, a valve, a packing and a slide valve.

4. The supply system according to claim 1, wherein at least one of opening and closing the obturator of the vane is controlled by an electronic regulation system of a turbomachine.

5. The supply system according to claim 1, wherein the vane is configured such that the obturator is automatically closed if the temperature of the fluid passing through the vane exceeds a threshold value.

6. The supply system according to claim 1, wherein the obturator of the vane comprises only two stable positions, an opening end position in which the vane lets fluid circulate in the recirculation branch and a closing end position in which the vane prevents fluid from circulating in the recirculation branch.

7. A turbomachine comprising:
a fluid supply system for supplying fluid, the supply system comprising:
  three centrifugal pumps in series,
  a displacement pump located downstream of the three centrifugal pumps in series and configured to supply an injection system with fluid, and
  a low pressure pump unit comprising said three centrifugal pumps in series, wherein the low pressure pump unit is located upstream of the displacement pump so as to supply the displacement pump with fluid, wherein the supply system is subdivided at an inlet node, located downstream of the low pressure pump unit, into an injection system supply circuit and a variable geometry supply circuit, wherein the injection system supply circuit comprises the displacement pump and wherein the injection system supply circuit is configured to supply the injection system with fluid, wherein the variable geometry supply circuit comprises a complementary pump unit comprising at least one centrifugal pump called a first centrifugal pump, wherein the variable geometry supply circuit comprises variable geometries located downstream of the first centrifugal pump, and wherein the variable geometry supply circuit comprises a fluid recirculation branch which includes:
- an inlet located between the first centrifugal pump and the variable geometries,
- an outlet located upstream of the first centrifugal pump, and
- a vane which is located between the inlet and the outlet of the fluid recirculation branch, wherein the vane comprises an obturator configured to open/close depending of the fluid temperature, and wherein the variable geometry supply circuit further includes an outlet node downstream of and in fluid communication with the variable geometries of the variable geometry supply circuit, the outlet node being located fluidly between two centrifugal pumps of the low pressure pump unit.

* * * * *